June 8, 1971  E. C. WHITE  3,583,058
METHOD OF MAKING PRESSURIZED PANEL
Filed Nov. 21, 1968

INVENTOR.
ERSKINE C. WHITE

BY
ATTORNEYS

United States Patent Office 3,583,058
Patented June 8, 1971

3,583,058
METHOD OF MAKING PRESSURIZED PANEL
Erskine C. White, Newport News, Va., assignor to the United States of America as represented by the Administrator of the National Aeronautics and Space Administration
Filed Nov. 21, 1968, Ser. No. 777,765
Int. Cl. B23p 17/00
U.S. Cl. 29—421    2 Claims

ABSTRACT OF THE DISCLOSURE

An apparatus and method for making relatively flat, large area pressurized meteoroid penetration detector panels. The structure of the panels includes an interconnected cellular configuration in which the cells have spaced periphery welds and tufts in their centers at which point a spot-weld is made. The panels are produced by prewelding sheets of metal together and then pressure forming them by placing them in a peripheral clamp and utilizing air pressure to expand the panel sides against two surface restricting shims.

ORIGIN OF INVENTION

The invention described herein was made by an employee of the United States Government and may be manufactured and used by or for the Government for governmental purposes without the payment of any royalties thereon or therefor.

SPECIFICATION

The invention herein described was made to easily provide relatively flat, large area pressurized meteroid penetration detectors having maximum inherent structural rigidity. These panels measure directly the penetration rate in materials to be used in spacecraft. Previous detectors were semicylindrical pressurized cell detectors with small penetration areas which measured penetration rates in very thin materials. These were relatively heavy configurations, often weighing 1.6 pounds per foot of penetration area. Furthermore, the design and small size of each sensor permitted the presentation of only one penetration area (0.1 sq. ft. per sensor), while the method of fabrication, hand soldering, proved to be extremely tedious, time-consuming, and costly. In addition, the soldering method is not compatible with the high temperature environments of many planned missions. The present invention overcomes these shortcomings by providing unique metal forming fabrication techniques to readily produce a new type of pressure panel that has a maximum penetration sensitive area-to-weight ratio, i.e., of at least .787 lb. per foot of penetration area, as well as low volume. Other advantages are minimum area lost due to fabrication, the ability to obtain various sizes and shapes, and simplicity of forming and fabricating panels having inherent structural rigidity without preforming the material.

It is therefore an object of this invention to provide a pressure panel that has a maximum penetration area-to-weight ratio, low volume, and inherent structural rigidity.

Yet another object of the invention is to provide a micrometeoroid detection panel which has both sides exposed to meteoroid penetration.

Still another object of the invention is to provide a micrometeroroid detection panel capable of being used in the temperature environments of various planets.

An additional object of the invention is to provide a micrometeoroid detector panel which can be constructed of various thicknesses enabling penetration testing of a variety of sizes and velocities of meteoroids.

Another object of the invention is to provide an apparatus and a method for the easy production of detector panels having the hereinbefore mentioned advantages.

These and other advantages of the present invention will become more readily apparent from the following description.

Figure 1:
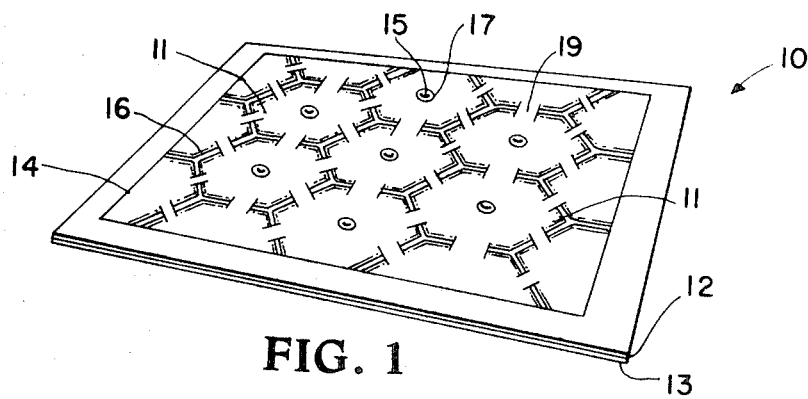
FIG. 1 is an isometric view of a finished meteoroid detector panel having centrally tufted cells in a hexagonal configuration.

Referring to the drawing in detail, FIG. 1 shows a completed pressure formed pressurized detector panel designated generally by the numeral 10. The detector panel 10 has hexagonally shaped cells 11, a welded perimeter seam 14 and spaced cell perimeter welds 16 which create vent spaces 19 between the cells 11. The cells 11 have tufted centers 17 at which point a spot weld 15 has been made. The tufted center-spot weld configuration has been found to greatly increase the overall structural rigidity of the panel. The detector panel 10 can be made to have cells conforming to any geometric shape. However, it has been found that the hexagonal configuration provides the greatest panel rigidity because there are no straight line elements to permit bending.

Figure 2:
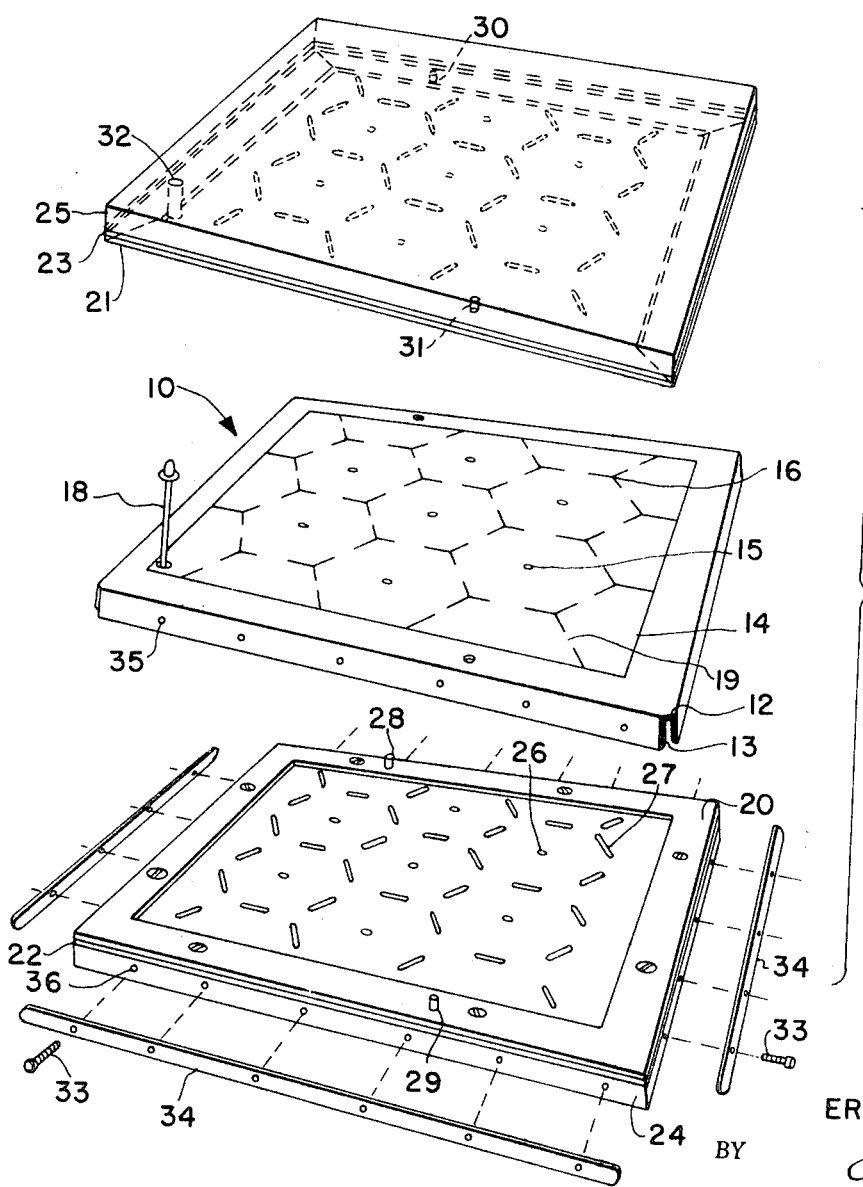
FIG. 2 is an exploded isometric view of the apparatus for the pressure forming fabrication of the detector panels of the present invention including an unfinished panel.

FIG. 2 shows an exploded isometric view of the apparatus for pressure forming the detector panels 10. A prewelded panel, i.e., is formed by placing two cleaned sheets 12 and 13 of the metal desired to be tested together and welding the panel perimeter seams 14, the cell center spot welds 15, and the spaced cell perimeter seams 16, the panel is then placed between the two plates of pressure forming apparatus. These consist of metal bases 24 and 25 upon which steel perimeter clamping plates 20 and 21 are screw mounted. The inner borders of these plates conform to the shape and size of the panel perimeter seam 14. Located beneath these are surface restricting shims 22 and 23. These shims have linear surface protrusions 27 which regulate the expansion of the sheets at the vent spaces, and circular protrusions 26 which regulate expansion at the center spot welds. The shims serve a purpose more fully explained hereinafter.

The prewelded panel has a compressed air hose fitting 18 attached by means of copper tubing to one sheet in one corner of the panel. There is an aperture 32 in the upper half of the pressure forming apparatus through which this fitting 18 protrudes so that once the panel sheets are properly clamped in the pressure forming apparatus, the compressed air hose may be attached and the proper pressure of compressed air applied to the panel.

Two positioning pins 28 and 29 which are attached to the steel perimeter clamping plate 20, fit into two apertures 30 and 31 located in the steel perimeter clamping plate 21. These pins serve to properly aline the apparatus parts.

The prewelded panel plate is placed in position on top of the perimeter clamping plate 20 and overlapping edges are crimped down along the sides of the metal base 24. Holes 35 are bored in the sheets so that steel clamping bands 34 may be tightly bolted to the sides of the metal base 24 by bolts 33 screwed into threaded bores 36 located in the sides of the metal base 20. In this way the crimped-over panel sheets are securely fastened between the bands 34 and the sides of the base 24. This is done to prevent the panel sheet from pulling in in response to stresses exerted upon it during the pressure forming process, for it has been found that the panel has a tendency to pull in after a certain amount of deformation has taken place when air pressure is introduced between the sheets 12 and 13. This is especially true depending on the thickness of the panels.

Once the panel has been adequately secured so as to prevent pull-in, pressure-forming is begun. This includes a three-stop, sequential pressurization of the panel, employing various levels of air pressure within certain physical constraints. For the fabrication of a detector panel out of two sheets of 0.017-inch thick 321 stainless steel, the following steps are involved. The prewelded panel is securely clamped between the two surface restricting shims 22 and 23 which restrict panel thickness to 0.125-inch. Air pressure at 200 pounds per square inch is then introduced into the panel through the previously installed fitting 18. This causes the cell corners to be expanded to the desired shape. After this initial pressure forming procedure is completed, the air pressure is released and the restrictions removed.

The now partially formed panel is then clamped between a second set of shims to limit the panel cell thickness to 0.250 inch. The panel is then pressurized to 100 pounds per square inch to expand the cells about their peripheries to the 0.250-inch thickness. Air pressure is then released and all surface restricting shims removed.

While still in the perimeter clamping device, the panel is then pressurized to 65 pounds per square inch, completing the cell formation. After depressurization, the formed panel is removed from the clamping device. A pressure sensor of the type disclosed in Pat. No. 3,238,774 is attached to one of the cells. Final pressurization to 45 pounds per square inch is accomplished at table top at which time the copper tube of the fitting 18 is crimped together, the fitting removed, and the remaining length of tubing coiled up. The panel is now ready to be incorporated into its satellite configuration.

Because the cells are interconnected, the penetration of any one of them by a meteoroid results in a pressure drop in the entire panel. The pressure sensor detects and relays this to the satellite's data system for recordation.

These panels may be made in any shape or size and with any cell configuration. A plurality of such panels can be utilized so as to form a configuration which is representative of any planned spacecraft.

While a preferred embodiment of this invention has been described, it will be understood that modifications and improvements may be made thereto. Such of these modifications and improvements as incorporate the principles of this invention may be considered as included in the hereafter appended claims unless these claims by their language expressly state otherwise.

What is claimed as new and desired to be secured by Letters Patent is:

1. The method of fabrication of an apparatus for detecting meteoroid penetration comprising the steps of:
   placing two sheets of thoroughly cleaned metal face-to-face;
   joining the perimeter of the sheets;
   joining spaced cell perimeters on the sheets;
   joining the center of each cell;
   placing the joined sheets in perimeter clamping means and between surface restricting shim means; and alternately pressurizing and depressurizing said joined sheets to incrementally pressure form them against said surface restricting means thereby increasing the thickness of a specific portion of the panel by suitable increments.

2. The method of fabrication of an apparatus for detecting material penetration comprising the steps of:
   placing two sheets of thoroughly cleaned metal face-to-face;
   joining the perimeter of the sheets;
   joining spaced cell perimeters on the sheets;
   joining the center of each cell;
   providing perimeter clamping means, suitable air pressurization means, and surface restricting shims which facilitate cell corner formation;
   placing the panel in said perimeter clamping means between said surface restricting shims;
   introducing suitable air pressure between the panel sheets thereby forcing them against the surface restricting means;
   depressurization of the panel and removal of said shims; then,
   providing surface restricting shim means which facilitate cell formation about the cell perimeters, again placing the panel in said perimeter clamping means between said second set of surface restricting shims, introducing suitable air pressure between the panel sheets thereby forcing them against the surface restricting shims, depressurization of the panel and removal of the shims;
   again placing the partially formed panel in the perimeter clamping means, introducing suitable air pressure between the panel sheets so as to expand them about their center junctures; and
   depressurization and removal of the completely formed panel from the perimeter clamping means.

References Cited

UNITED STATES PATENTS

| | | | |
|---|---|---|---|
| 1,685,388 | 9/1928 | White | 122—265 |
| 1,712,085 | 5/1929 | Litle, Jr. | 62—523 |
| 2,949,876 | 8/1960 | Staples | 29—157.3X |
| 3,166,831 | 1/1965 | Keith | 29—421X |
| 3,238,774 | 3/1966 | Gurtler | 73—170 |
| 3,340,711 | 9/1967 | Agin | 29—421X |
| 3,458,917 | 8/1969 | Mueller | 29—421X |

JOHN F. CAMPBELL, Primary Examiner

V. A. Di PALMA, Assistant Examiner

U.S. Cl. X.R.

73—170R